Jan. 3, 1950     W. F. AYCOCK     2,492,944
MEANS AND METHOD OF INTRODUCING LIQUID
FERTILIZER INTO IRRIGATION STREAMS
Filed June 24, 1944
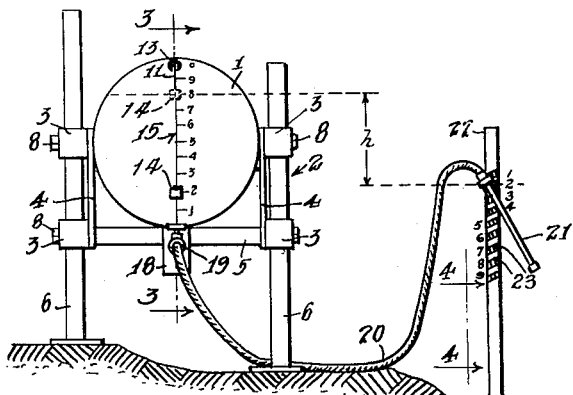
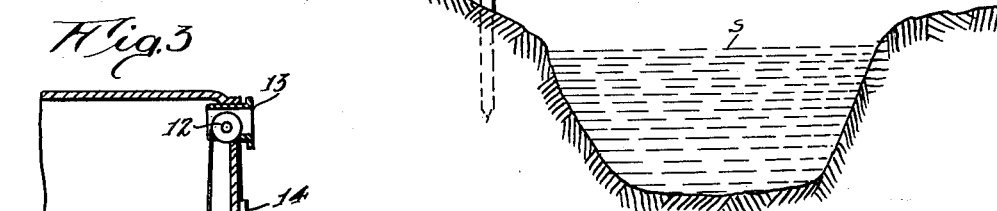
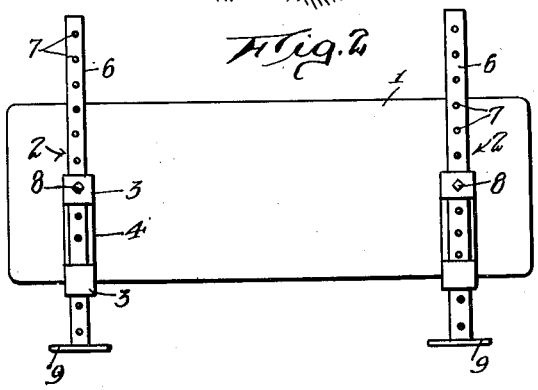
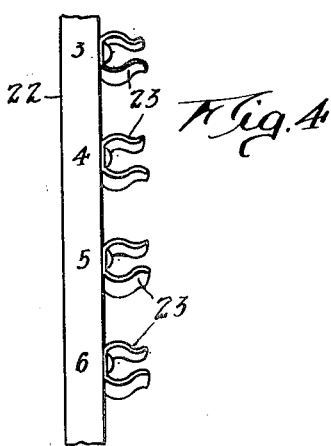
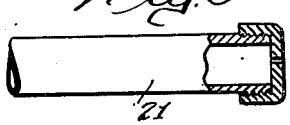
Inventor
Walter F. Aycock
By Lyon & Lyon
Attorneys Patented Jan. 3, 1950

2,492,944

UNITED STATES PATENT OFFICE 2,492,944

MEANS AND METHOD OF INTRODUCING LIQUID FERTILIZER INTO IRRIGATION STREAMS

Walter F. Aycock, El Centro, Calif., assignor, by mesne assignments, to Tank Fertilizer, Inc., Brawley, Calif., a corporation of California Application June 24, 1944, Serial No. 541,980

8 Claims. (Cl. 222—416)

My invention relates to means and method of introducing liquid fertilizer into irrigation streams.

An object of my invention is to provide a means and method of this character whereby a substantially uniform quantity of liquid fertilizer may be introduced into an irrigation stream over a relatively long period of time.

Another object is to provide a means and method of introducing liquid fertilizer which employs the simplest of equipment capable of being operated properly by the most inexperienced or illiterate farm hand.

A further object is to provide a means and method of this character wherein the liquid fertilizer is dispensed from a tank disposed adjacent the irrigation stream, and although the liquid level lowers in the tank, the difference in discharge head is maintained substantially constant.

Further objects of the invention will appear hereinafter.

The invention consists in the novel means and method to be described hereinafter, all of which contribute to produce an efficient means and method of introducing liquid fertilizer into irrigation streams.

A preferred embodiment of the invention is described in the following specification, while the broad scope of the invention is pointed out in the appended claims.

In the drawing:

Fig. 1 is an end view of the liquid fertilizer supply tank shown beside an irrigation stream and illustrating the manner in which the level of the discharge nozzle is adjusted;

Fig. 2 is a side view of the tank;

Fig. 3 is a fragmentary sectional view through 3—3 of Fig. 1;

Fig. 4 is an enlarged fragmentary elevational view of the nozzle supporting part taken from 4—4 of Fig. 1;

Fig. 5 is a partial sectional, partial elevational view of the discharge nozzle.

With reference to the drawings, a tank 1, preferably a cylindrical tank, is provided at each end with a pair of leg guide units, each unit comprising two collars 3 held in alignment by a connecting member 4. The lower collars 3 have each a pair of guide units 2 and are joined by a cross brace 5.

Each guide unit receives a tubular leg member 6 provided with a series of holes 7, any one of which receives a pin 8 to adjust the length of the leg member. The lower end of each leg member is provided with a foot plate 9.

Within the tank 1 is a float 10 attached to a suitable cord 11 which passes upwardly and over a pulley 12 suitably mounted in a fitting 13. The cord 11 extends outside the tank preferably down one end thereof that has attached thereto a marker member 14. The marker coacts with a scale 15 provided on the end of the tank. The scale is preferably arranged to indicate in tenths the amount of fluid withdrawn from the tank. Thus the scale reads bottom upwardly 1 to 10. Fluid is discharged from the tank through an outlet tube 16 into a strainer 17 located within a sump housing 18. A valve 19 permits a discharge of the fluid from the sump into a hose 20. The hose 20 is provided with a nozzle 21 at its extended end for directing fluid from the tank into an irrigation stream designated at S in Fig. 1. The nozzle is supported at various heights on the side of a post 22 by means of spring clamp 23. The post 22 is driven into the ground beside the irrigation stream, and the spring clamps 23 are positioned one above the other on the side of the post, their spacing being equal to the spacing of the scale 15 and may be correspondingly marked.

By reason of the fact that the scale 15 and the arrangement of the clamps 23 are equal in spacing, all points on the scale are equal in height from their corresponding clamps as indicated by $h$ in Fig. 1. Thus when the tank is full the nozzle is held by the uppermost clamp; then as the liquid level in the tank is lowered, the nozzle is likewise lowered to clamps which correspond with the marker indication. The head between the liquid level in the tank and the discharge point of the nozzle, remains substantially constant. As a consequence, the rate of flow of liquid from the nozzle remains substantially constant over the whole period required to drain the tank.

The apparatus is employed as follows: A tank full of liquid fertilizer is placed beside an irrigation stream and adjusted by means of the leg members 6 until it is substantially level. If the tank is full, the nozzle is placed in the upper or No. 1 clamp. The valve 19 is adjusted so that the rate of discharge from the nozzle is at the desired rate. This may be determined by use of any suitable measuring container. In practice, a pint or quart milk bottle is used, and the time in which it takes to fill such container is noted. After initial adjustment it is merely necessary to move the nozzle downward from clamp to clamp as the liquid level in the tank is lowered to insure virtually uniform discharge of liquid fertilizer into the irrigation stream. This is a task which may be entrusted to the most unskilled farm hand, with the assurance that a reasonably uniform supply of liquid fertilizer will be provided. It should be borne in mind that the process of introducing the liquid fertilizer may be carried on for a period of several hours. Therefore, the simplicity with which uniform discharge into the irrigation stream is accomplished, is of utmost importance.

The nozzle 21 may be designed to receive orifice cleats or caps having different size holes. The flow from the tank may be determined by the size of nozzle, in which case the valve 19 is fully opened. The relative height between the liquid level and the nozzle may be preselected so that it will be known in advance when a nozzle of a certain size will permit a predetermined flow.

Many other embodiments of the invention may be resorted to without departing from the spirit of the invention.

I claim:

1. A means for introducing liquid fertilizer into an irrigation stream, comprising: a liquid fertilizer supply tank, means for supporting said tank beside an irrigation stream, a readily visible liquid level gage for said tank a liquid level indicator associated with said gage, a discharge conduit terminating in a nozzle, a post positioned beside the irrigation stream, and means for supporting said nozzle at different elevations on said post corresponding to selected stations on said gage, said elevations being a constant distance below the liquid level of said tank, as evidenced by the indicator on said gage whereby as the liquid level in said tank is lowered the nozzle may be lowered correspondingly to maintain a' substantially constant head.

2. A means for introducing liquid fertilizer into an irrigation stream, comprising: a liquid fertilizer supply tank, adjustable leg members for supporting said tank in a level position and at a selected elevation beside and above an irrigation stream, a conduit leading from the bottom of said tank and terminating in a discharge nozzle, a post positioned beside the irrigation stream, and means for supporting said nozzle at different elevations on said post located at predetermined levels below and corresponding to selected fluid levels in said tank whereby as the liquid level in said tank is lowered the nozzle may be lowered correspondingly to maintain a substantially constant head.

3. A means for introducing liquid fertilizer into an irrigation stream, comprising: a liquid fertilizer supply tank, adjustable leg members for supporting said tank in a level position and at a selected elevation beside and above an irrigation stream, a liquid level gage including a vertically movable marker at an end of said tank, a cooperating scale therefor, and a float in said tank attached to said marker, a conduit leading from the bottom of said tank and terminating in a discharge nozzle, a post positioned beside the irrigation stream, and means for supporting said nozzle at different elevations on said post located at predetermined levels, corresponding to points on said scale whereby said nozzle may be periodically lowered to maintain the liquid head between the liquid level in said tank and the discharge end of said nozzle substantially constant as the liquid is discharged from said tank.

4. A means for introducing liquid fertilizer into an irrigation stream, comprising: a cylindrical tank adapted to hold a supply of liquid fertilizer; adjustable legs at the ends of said tank for mounting the tank in a level position beside and at a selected elevation above an irrigation stream, a liquid level gage including a marker and cooperating scale on the end of said tank, a float connected with said marker, a discharge conduit for said tank, a post adapted to be positioned beside the irrigation stream and provided with a scale corresponding to said gage scale, the liquid level in said tank as indicated by said tank scale and corresponding points on said post scale being constant; and means on said support for supporting the discharge end of said conduit at different points on said post scale corresponding to said gage scale whereby the liquid head is maintained substantially constant with corresponding uniformity in the discharge of liquid fertilizer from said nozzle.

5. A construction as set forth in claim 4 wherein said supporting means on said post is a series of clips positioned in correspondence with the scale points on said tank scale, each adapted to removably receive the discharge end of said conduit.

6. A construction as set forth in claim 1 wherein said nozzle supporting means comprises a plurality of spring clips positioned on said post in correspondence with points of said gage.

7. A means for introducing liquid fertilizer into an irrigation stream, comprising: a liquid fertilizer supply tank; a discharge hose for said tank; a post for supporting the discharge end of said hose to deliver the fertilizer to an irrigation stream; corresponding lineal gage scales on said post and on said tank, a float marker for said tank gage scale; and support means for the discharge end of said hose disposed at different elevations on said post to support the same at points on its gage scale which correspond to the positions of the marker on the gage scale of said tank whereby upon periodically altering the discharge position of said hose in correspondence with said tank gage marker, a substantially uniform rate of fluid discharge from said hose is maintained.

8. A method of introducing liquid fertilizer into an irrigation stream, characterized by: placing a tank containing a liquid fertilizer at a preselected elevation above an irrigation stream; placing a discharge nozzle communicating with said tank at a predetermined level below said tank and directed into said irrigation stream; and periodically lowering said discharge nozzle as the contents of said tank are depleted to maintain a substantially constant head between the level of the nozzle and the level of liquid in said tank thereby to maintain a substantially uniform rate of discharge of liquid fertilizer into said irrigation stream.

WALTER F. AYCOCK.

REFERENCES CITED

The following references are of record in the file of this patent:

UNITED STATES PATENTS

| Number | Name | Date |
|---|---|---|
| 756,439 | Vrooman | Apr. 5, 1904 |
| 1,862,238 | Roe | June 7, 1932 |
| 2,010,363 | Hine | Aug. 6, 1935 |
| 2,021,247 | Waugh | Nov. 19, 1935 |